United States Patent
Obermaier

[15] 3,680,597
[45] Aug. 1, 1972

[54] DUAL VALVE CONSTRUCTION

[72] Inventor: Frank E. Obermaier, Morton Grove, Ill.

[73] Assignee: Eaton Corporation, Cleveland, Ohio

[22] Filed: March 11, 1970

[21] Appl. No.: 18,524

[52] U.S. Cl. ............... 137/630.19, 137/607, 137/609
[51] Int. Cl. ................................................ F16k 19/00
[58] Field of Search....137/596.18, 607, 609, 630.19, 137/627; 251/305, 308; 236/13, 38

[56] References Cited

UNITED STATES PATENTS

| | | | |
|---|---|---|---|
| 2,726,679 | 12/1955 | Countryman | 137/607 X |
| 324,762 | 8/1885 | Fleischer et al. | 137/630.19 X |
| 1,303,939 | 5/1919 | Moellmer | 137/609 X |
| 1,763,802 | 6/1930 | Levy | 137/609 X |
| 2,833,298 | 5/1958 | Shannon | 236/13 UX |
| 2,912,231 | 11/1959 | Goemann | 236/13 X |
| 2,970,768 | 2/1961 | Curran | 236/13 UX |
| 2,991,937 | 7/1961 | Bottorf et al. | 236/13 |

FOREIGN PATENTS OR APPLICATIONS 331,538  7/1930  Great Britain..................236/13

*Primary Examiner*—Robert G. Nilson
*Attorney*—Hill, Sherman, Meroni, Gross & Simpson

[57] ABSTRACT

A valve body having first and second openings with a third opening therebetween includes a first valve means in the body positioned between the first and third openings and a second valve means in the body positioned between the third and second opening whereby flow through and between the openings may be controlled. Each of the first and second valve means has an operator means connected therewith so that the valve means may be moved between an open and a closed position. For each valve means a pivot member allows rotation thereof and a pivot arm connected to the pivot member is in turn attached to an actuator arm of the operator means whereby substantially linear movement of the actuator arm will rotate the first and second valve means. Each pivot arm may be connected to a separate actuator arm having a separate power means. Alternatively a single operator means may control both valves when the second valve means is provided with a resilient means that biases the second valve to a closed position.

6 Claims, 4 Drawing Figures

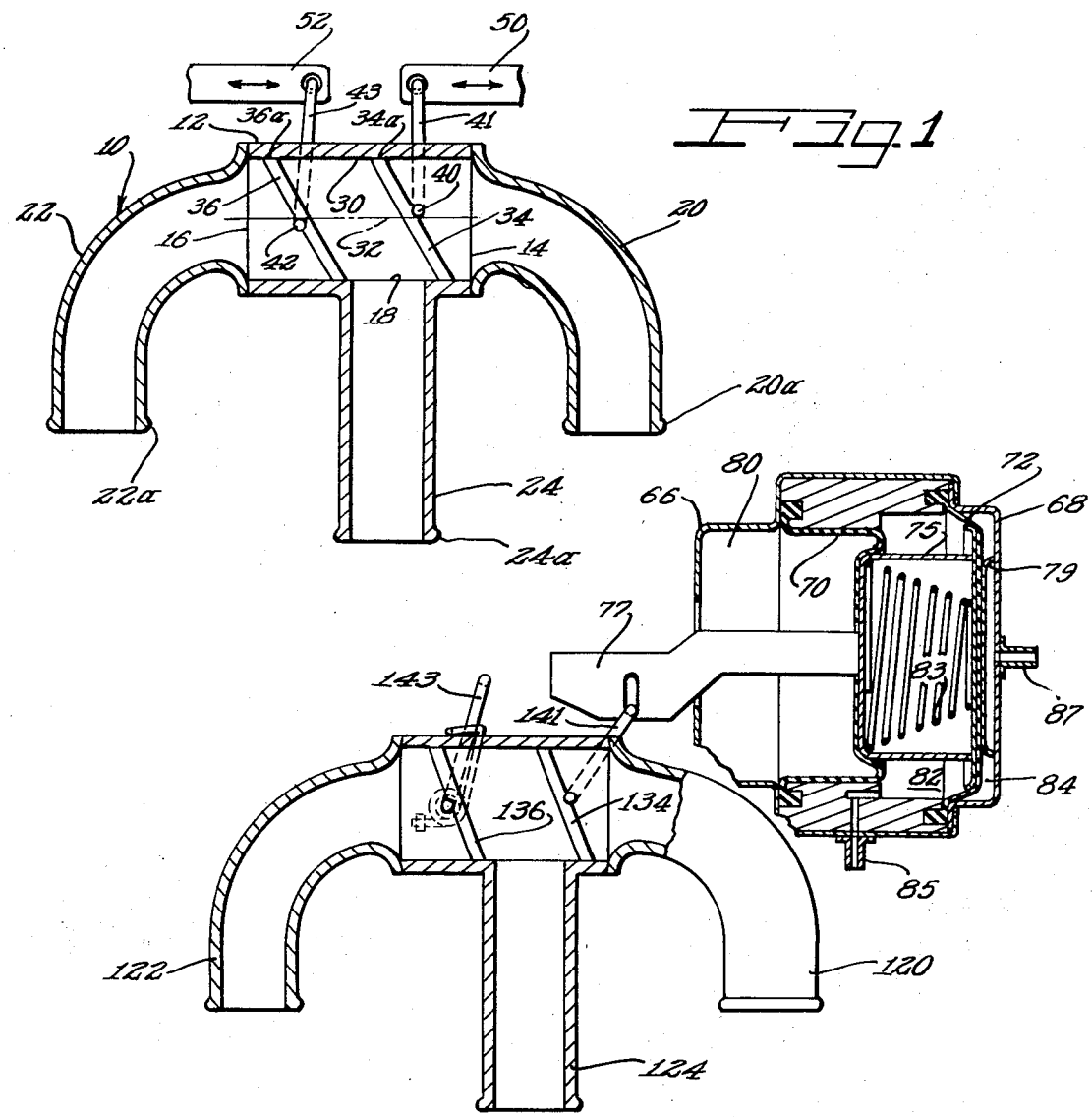

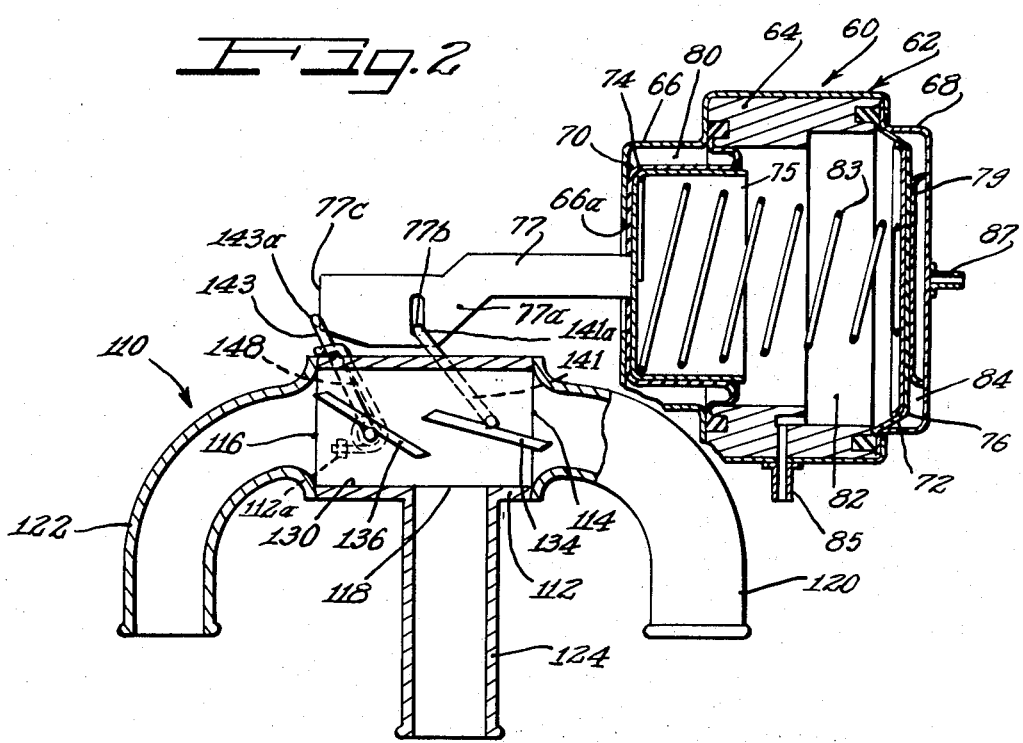
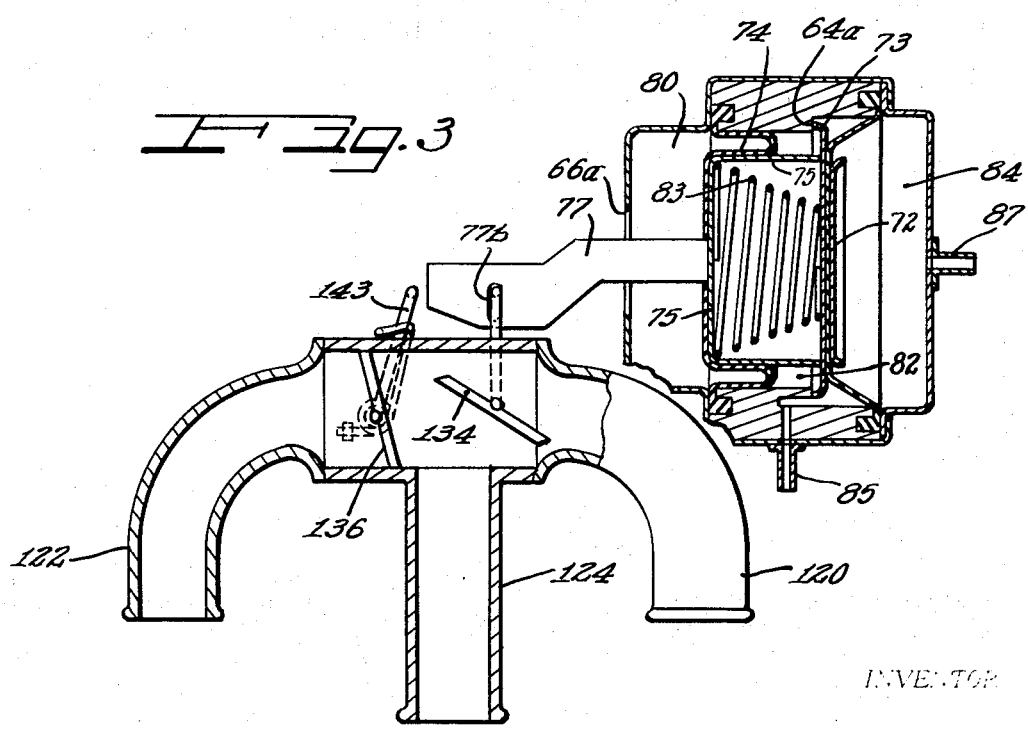
INVENTOR
Frank E. Obermaier 3,680,597

DUAL VALVE CONSTRUCTION

BACKGROUND OF THE INVENTION

This invention generally relates to a multiple fluid valve assembly and more particularly contemplates the provision of a pair of butterfly valves positioned intermediate the openings of a valve body having three openings whereby the butterfly valves may coact to control the flow of fluid therethrough. Control of the two valve means may be by a single valve operator or by two separate valve operators, one for each valve.

With the increasing requirements for efficiency, simplicity, economy and compactness in devices as various as space vehicles, automobiles and wash machines, there has developed a need for fluid flow control devices embodying these advantages. Thus, for example, in the control of hot and cold water in a washing machine according to prior art constructions two separate valves and their interconnecting pipes are required, one for hot water and one for cold water. According to the above noted needs control of the hot and cold water for the various temperature cycles requires an easily adjustable, durable, compact and economical valve. Not only do the separate valves of the prior art and their interconnecting piping require a relatively large amount of space, but each must be made separately and with greater expenditures of material and labor. Also, each requires separate machining operations, separate assembly operations as well as separate installation and repair.

In the control of fluid flow in automotive heater core assemblies, as another example, similar design requirements prevail and in addition it is very advantageous if core flows may be simply and easily reduced by approximately 25 percent. With the two separate valve constructions according to the prior art not only are the needs of efficiency, simplicity, economy and compactness not fully met, but a reduction of this amount of flow is difficult and expensive.

SUMMARY OF THE INVENTION

To overcome the above-noted limitations present in the prior art, I have invented a multiple valve assembly which efficiently and economically controls fluid flow. According to my invention a single cylindrical body having first and second opposite end openings and a third opening intermediate the end opening has a first valve means positioned therein between the first and third openings and a second valve means positioned therein between the second and third openings. The interior of the cylindrical body member has a single central axis and thus a single machining operation of the body member will serve for two valves. Each of the valve means is separately movable between an opened position and a closed position by simple valve operator means associated therewith. Each of the first and second valve means may be of a butterfly type having a pivot member providing an axis about which each valve closure plate pivots. The pivot members are attached to the valve closure plates and may have one end extending through the body member and connected with a pivot arm extending at an angle thereto so that movement of the pivot arm rotates the butterfly valve in the body member. The periphery of the closure plate of course is shaped to provide a fluid tight seat with the interior of the body member.

Each of the pivot arms of the first and second valve means may be moved by a single, common valve operator means or by separate valve operator means. Control of both valve means by a single common valve operator is also possible where the first pivot arm is directly connected to an actuator arm of the operator means and where a resilient means is provided on the pivot arm of the second valve means to bias the second valve means to a closed position when it is not bearing against a portion of the actuator arm. The operator means may take various forms. When a three position vacuum motor is used, both of the first and second valve means are open when the vacuum motor is in a first position, the second valve means is closed and a first valve means is open when the vacuum motor is in a second position and both of the first and second valve means are closed when the vacuum motor is in a third position. In the first position the actuator arm bears against the pivot arm to overcome the bias of the closure spring while in the second and third positions the closure spring biases the second valve means to a closed position. When the third opening to the valve body is an inlet and the first and second openings are outlets the second position of the vacuum motor results in a reduction of 25 percent of its dual capacity whereas when the fluid is fed through both inlets the valve operates at 100 percent capacity.

When separate valve operator means are used for each of the first and second valve means as might be the case where the valve functions to control hot and cold water in a wash machine for example, the first and second openings would be hot and cold water inlets and the third opening would be a common outlet and water flow as well as the temperature of the flow are easily controlled by alternately closing both inlets, opening both inlets, and opening one inlet while closing the other. Also, of course, both may be opened and closed in various degrees. This simple control of the hot and cold fluids for the various temperature cycles provides an easily adjustable, durable, compact and economical valve.

BRIEF DESCRIPTION OF THE DRAWINGS

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure and in which:

FIG. 1 is a cross-sectional view of an embodiment of my invention wherein separate operator means are provided;

FIG. 2 is a cross-sectional view of another embodiment of my invention having a single, common operator means in the form of a vacuum motor, in the position shown both valve means are open;

FIG. 3 is a view similar to FIG. 2 showing the single common operator means in a position with a first valve means open and a second valve means closed; and FIG. 4 is another view similar to FIGS. 2 and 3 showing both valve means closed.

DESCRIPTION OF THE PREFERRED EMBODIMENT

A valve assembly generally indicated at 10 in FIG. 1 includes a valve chamber body member 12 having therein a first end opening 14, a second end opening 16 and a third central opening 18. The chamber body member may be of any convenient configuration, however, I have found a cylindrical configuration to be very suitable. The chamber body member 12 may have affixed thereto or integral therewith fluid conduit members communicating with the openings 14, 16 and 18. Thus, as shown, an elbow-like first conduit member 20 may be attached to the body member 12 about the first opening 14 in a fluid tight manner. Similarly, a second fluid conduit member 22 may be attached to the body 12 about the second opening 16 to convey fluids to and from the valve body 12.

A third conduit member 24 which may be integrally formed with the valve body 12 communicates with the third opening 18 to allow fluid flow therethrough. Although the conduit members 20 and 22 are shown as elbow members and the conduit 24 is shown as being straight it is within the contemplation of this invention that these members may be of other configurations. Each of the conduit members 20, 22 and 24 may have an enlarged outer surface 20a, 22a and 24a respectively adjacent an end remote from the chamber body to facilitate further conduit connections.

As will be explained hereinafter in greater detail with respect to other embodiments of this invention, it will be understood that each of the conduit members 20, 22 and 24 may function individually as a fluid inlet or a fluid outlet in all of their various combinations. Thus, for example, if the conduit 20 is an inlet, the conduits 22 and/or 24 may be outlets, or if the conduit 24 is the fluid inlet, the conduits 20 and/or 22 may be outlets or if both conduits 20 and 22 are fluid inlets the conduit 24 may be an outlet etc. All arrangements of fluid flow possible with the valve construction of the constructions set forth herein are within the contemplation of this invention.

The valve chamber body member 12 has an inner surface 30 which as heretofore set out for the body member 12 may be of a cylindrical configuration. An axis 32 as shown in FIG. 1 may serve as the central axis of both the body member and inner surface.

A first butterfly valve means 34 and a second butterfly valve means 36 are each pivotally positioned on the interior of the body 12 and are each adapted to rotate between an open position as shown in FIG. 2 and a closed position as shown for example in FIG. 1. Each valve member 34, 36 may be of a generally circular configuration having respective peripheral edges 34a, 36a which engage the interior surface 30 in a fluid-tight relationship when they are pivoted to a closed position as shown in FIG. 1. In such closed position the butterfly valves 34, 36 may be inclined at an angle to the axis 32 and the peripheral edges 34a, 36a may be beveled accordingly to provide a fluid tight fit.

The means for pivoting or actuating the valves 34, 36 include transverse pivot members 40, 42 respectively which pivot members may extend entirely through the walls of the chamber body 12 and have associated therewith exterior portions 41, 43 that extend outwardly from the chamber body 12 and in angular relation to their respective pivot members 40, 42 so that they may be engaged by respective actuator means 50, 52. The valve actuator means 50, 52 may be powered by any suitable power means such as solenoids, heat motors, bi-metal devices, vapors charge bellows, liquid expansion thermostatic devices, change of state or phase means, or thermostatic expansion devices. Two separate actuator power means such as shown at 50 and 52 may be provided as shown in FIG. 1 or a single valve actuator means may be provided as will hereinafter be explained in greater detail with respect to FIGS. 2, 3 and 4.

In operation, the substantially linear movement of the valve actuator means 50 and 52 will rotate the pivot arms 41 and 43 which in turn are fixed to the pivots 40, 42 and thus the valves 34 and 36 will be rotated in a counter-clockwise direction from the closed position shown in FIG. 1. Of course, the actuator means 50 and 52 may move the valves 34 and 36 either separately or together to regulate the flow of fluid through the openings 14, 16, 18 and conduit members 20, 22 and 24.

In one very advantageous use of the valve of the present invention fluids of different temperatures are mixed in easily regulated ratios. Thus, for example, where it is desired to mix hot and cold water in a washing machine the cold water source may be connected with the first conduit 20 and the first opening 14 and the hot water may be connected with the second conduit 22 and the second opening 16 so that a regulation of the movement of the first and second butterfly valves 34, 36 will result in water of a desired temperature flowing out of the third opening 18 and through the third conduit 24. Thus, as shown in FIG. 1, where there are two separate power sources represented at 50 and 52 it will be understood that as shown, both the hot and cold water supplies through the conduit members 20 and 22 respectively may be shut-off. Further, the first valve 34 may be left closed while the second valve 36 is opened to allow the circulation of only hot water through the valve body 12 and out of the conduit 24. Conversely, with the second valve 36 closed and the first valve 34 opened only cold water will flow through the valve. On the other hand if a mixture is desired both of the valves 34 and 36 may be opened a predetermined amount to allow a mixture of the desired ratio of cold and hot water through the outlet 18 and conduit 24 whereby wash water of the desired temperature may be quite easily and readily supplied. The movement of the valves and their relative positions during different combinations of positions of use may be seen in FIGS. 2, 3 and 4.

From the above noted example it will be apparent that I have provided a simple, inexpensive, trouble free device, readily adaptable to various conduit connections and valve actuator power sources, that displaces the two or more relatively complex valves as were necessary according to the prior art.

In FIGS. 2,3 and 4 there is shown an embodiment of my invention in which a single actuator serves to control both of the first and second valve means. This embodiment, in which the single actuator means is a vacuum pump, is particularly suited for internal combustion engine cooling systems wherein the flow of fluid will be through a single inlet and dual outlets.

Since the construction of the valve means may theoretically be the same, the description of these parts will not be repeated, but instead the portions of FIGS. 2, 3 and 4 similar to FIG. 1 bear numbers corresponding to FIG. 1 but prefixed with a "1."

A three position vacuum motor 60 as shown in FIGS. 2, 3 and 4 include an enclosure body generally indicated at 62 having a central portion 64, a first forward end closure portion 66 and a second rearward end closure portion 68. Within the enclosure 62 there is provided a first diaphragm member 70 and a second diaphragm member 72.

The first diaphragm member 70 includes a first flexible member 74 partitioning or dividing a first forward portion 80 from the remainder of the closure interior. This forward portion 80 is open to the atmosphere through an opening 66a in the forward end closure 66. The second diaphragm member 72 includes a similar second flexible member 76 that partitions the remaining portion into a second central air tight portion 82 and a third rearward air tight portion 84.

A cup-shaped spacer, support member 75 is centrally attached to the first flexible member 74 so it lies in the second central portion 82 and forms a part of the first diaphragm means 70. Attached to the support spacer member 75 is an actuator arm 77 which projects forwardly through the opening 66a in the end closure 66. The second diaphragm member 72 has attached thereto a spacer member 79 that serves to space the second flexible member 72 from the interior of the rearward end closure 68. A resilient means which may be a coil spring 83 serves to separate the first and second diaphragm 70 and 72 from each other.

A first vacuum connection 85 communicates with the second central portion air tight portion 82 to allow air to flow into and out of this portion. A second vacuum connection 87 likewise communicates with the third rearward portion and thus makes possible application of vacuum to this portion also.

With no vacuum applied to either connection 85, 87 the spring 83 will keep the first diaphragm member 70 biased against the forward end closure 66 and the second diaphragm member 72 together with its spacer 79 pressed against the rearward end closure 68. In this first position the actuator arm 77 projects almost entirely beyond the opening 66a and is in its forwardmost position. As shown in FIG. 2 the actuator arm 77 opens both the first and second valve means 134, 136 when it is in this forwardmost first position. Thus, if the conduit 124 is an inlet and the conduits 120 and 122 are outlets, fluids entering the inlet will flow through both outlets.

In the embodiment of FIGS. 2, 3, 4 the actuator arm 77 has an enlarged portion 77a in which there is an opening 77b that receives the upper end 141a of the first pivot arm 141. The second pivot arm 143 is biased toward a closed clockwise position by a spring means 148 may have one end anchored by a projection 112a of the body member 112.

In its forwardmost position the forward butt end 77c of the actuator arm 77 bears against an end portion 143a of the pivot arm 143 and moves it and the attached second valve 136 to an open position against the bias of the spring 148 as shown in FIG. 2.

As shown, the forward movement of the arm 77 may also move the first valve actuator arm 141 and the first valve 134 positively counter-clockwise to an open position as shown in FIG. 2.

When vacuum is applied to the nipple 85 the air is drawn out of the central portion 82 and it is collapsed against the pressure of the spring 83 to a position as shown in FIG. 3. The final collapsed position is fixed by the engagement of an abutment means 64a on the central portion 64 with a stiffener member 73 of the second diaphragm 72. The stiffener member 73 also provides a solid means against which the spacer 75 may bear when the vacuum motor is so collapsed.

In the position of FIG. 3 the nipple 87 has no vacuum force applied thereto. In this case the pivot arm 77 will be partially retracted into the enclosure 62 thereby positively rotating the pivot arm 141 and its associated first valve 134 and allowing the spring 148 to rotate the pivot arm 143 and its associated second valve 136 in a clockwise direction. As arranged, the amount of rotation in the illustrated embodiment will be such that the second valve 136 is held closed by the spring means 148 whereas the first valve means is still open.

The pivot arm portion 143a may no longer bear against the actuator arm 77, but will be retained in place by the spring 148 biasing the valve 136 into engagement against the interior 130 of the valve body 112. In this position fluid flowing into an inlet conduit 124 will flow out through the conduit 120.

In FIG. 4 there is shown the position of the vacuum motor as it would appear when a vacuum has been applied to both of the nipples 85 and 87. Vacuum on the nipple 85 evacuates the second central air tight portion 82 and causes the atmosphere pressure in the first portion 80 to collapse the first membrane 70 against the second diaphragm member 72. Likewise vacuum on the nipple 87 evacuates the third rearward portion 84 and again the atmospheric pressure in the first portion 80 is transmitted through the spacer 75 to the second membrane 72 to collapse it against the rearward end closure 68 in which case the member 79 acts as a positive spacer positioner means. Rearward movement of the first diaphragm member and the attached actuator arm 77 rotates the first pivot arm and first valve means 134 to a fluid tight closed position against the valve body interior 130. Of course the second valve means 136 remains in a spring means biased closed position.

In this position both outlet conduits 120 and 122 are closed stopping flow through the valve.

As vacuum is variously released from the nipples 85 and 87 the diaphragms and actuator arm will move to the alternate positions shown in FIGS. 2, 3 and 4 in accordance with the principle of operation already set forth to thereby allow the quick and efficient control of the flow of fluid through the valve body 112 and its associated conduits. While a three position vacuum motor has been described it is to be understood that any equivalent actuator power means is within the contemplation of my invention.

Although minor modifications might be suggested by those versed in the art, it should be understood that I wish to embody within the scope of the patent warranted hereon all such modifications as reasonably and properly come within the scope of my contribution to the art.

I claim as my invention:

1. A dual valve construction comprising a fluid conducting body member having first and second end openings and a third opening intermediate said first and second openings, a first valve means in said body member controlling fluid flow between said first opening and said third opening, said first valve means being pivotable about an axis in a first direction between a closed and a open position, said first valve means including a pivot arm connected therewith whereby said first valve means pivots in a first direction between an open position and a closed position to regulate flow between said first and third openings, a second valve means in said body member controlling fluid flow between said second opening and said third opening, said second valve means being pivotable about an axis in a first direction between a closed and an open position, said second valve means having a pivot arm connected therewith whereby said second valve means is pivotable between an open position and a closed position to regulate fluid flow between said second and third openings, said second pivot arm having a resilient bias means connected therewith biasing said second valve means in a direction opposite to said first direction to a closed position, a generally linearly movable valve operator means having a first portion and a second portion, said first pivot arm being connected to said first portion whereby said first pivot arm will move only in response to movement of said valve operator, said second pivot arm being adapted to bear against said second portion of said valve operator means when said second valve means is being moved between said closed and opened position, said first and second pivot arms being spaced so that said first valve means must be opened before said second valve means can be opened.

2. A dual valve construction according to claim 1 wherein said valve operator means has first, second and third positions, both of said first and second valve means being open when said valve operating means is in said first position, said second valve means being closed and said first valve means being opened when said valve operator means is in said second position and both of said first and second valve means being closed when said valve operator means is in said third position.

3. A dual valve construction according to claim 2 wherein said valve operator means is operated by a three position vacuum motor which determines the three positions of said valve operator means.

4. A dual valve construction according to claim 1 wherein said valve operator means is in direct pivotal engagement with said pivot arm of said first valve means and wherein said valve operator means has a forward portion movable into and out of contact with said pivot arm of said second valve means to move said second valve means against the bias of said resilient means.

5. A dual valve construction according to claim 1 wherein said body member housing said first and second valve means has a cylindrical interior configuration with a central axis, said first and second valve means including disc-like members of greater diameter than said interior diameter of said body member so that when said first and second valve means are closed said disc-like members are inclined with respect to said central axis, said first valve means having a pivot axis transverse to and substantially on one side of said central axis of said body member and said second valve means having a pivot axis transverse to and substantially on an opposite side of said central axis, said pivot arms of said first and second valve means being connected to said closure plates of said first and second valve means in fixed angular relation thereto, and operable to move said closure plates between opened and closed positions in said body member.

6. A dual valve construction according to claim 1 wherein said pivot arm of said first valve means is engaged by a slot means in said valve operator means, said valve operator means having a forward portion adapted to move into and out of abutment with said pivot arms of said second valve means to move said second valve means against the bias of said bias means.

* * * * *